United States Patent
Hori

(10) Patent No.: US 8,170,775 B2
(45) Date of Patent: May 1, 2012

(54) FUEL INJECTION DEVICE FOR INTERNAL COMBUSTION ENGINE

(75) Inventor: Yasuyoshi Hori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 261 days.

(21) Appl. No.: 12/708,155

(22) Filed: Feb. 18, 2010

(65) Prior Publication Data

US 2010/0224175 A1     Sep. 9, 2010

(30) Foreign Application Priority Data

Mar. 9, 2009   (JP) .................................. 2009-054641

(51) Int. Cl.
*F02D 41/22*     (2006.01)

(52) U.S. Cl. ........ 701/107; 123/674; 123/479; 123/431; 123/198 A

(58) Field of Classification Search .......... 701/103–105, 701/107; 123/674, 704, 431, 575, 479, 1 A, 123/198 A See application file for complete search history.

(56) References Cited

U.S. PATENT DOCUMENTS 6,820,595 B2 * 11/2004 Kobayashi et al. ........... 123/478

FOREIGN PATENT DOCUMENTS

| JP | 2-1438 U | 1/1990 |
|----|----|----|
| JP | 2003-120363 A | 4/2003 |
| JP | 2004-285972 A | 10/2004 |
| JP | 2008-144723 A | 6/2008 |
| JP | 2009-024504 A | 2/2009 |
| JP | 2010-048236 A | 3/2010 |
| JP | 2010-209724 | * 9/2010 |
| JP | 2011-43147 | * 3/2011 |

OTHER PUBLICATIONS

Japanese Office Action, (Notification of Reasons for Rejection), dated Jan. 4, 2011 for corresponding Japanese Patent Application No. 2009-054641.

* cited by examiner

*Primary Examiner* — Hai Huynh
(74) *Attorney, Agent, or Firm* — Sughrue Mion, PLLC

(57) ABSTRACT

The device including: a fuel correction value calculating unit for calculating a correction value for a fuel injection quantity so that an actual air-fuel ratio becomes equal to a target air-fuel ratio; a fuel switching detecting unit for detecting that fuel switching has occurred; a fuel property estimating unit for setting a period, in which there is a possibility that a fuel property changes, as a property change period when the fuel switching is detected to calculate a fuel property correction value corresponding to another correction value for the fuel injection quantity based on the correction value within the property change period; and a property change judging unit for judging whether or not a change in the correction value is due to the change in the fuel property in a case where the correction value becomes out of a predetermined range even though the property change period is not set.

9 Claims, 11 Drawing Sheets

FUEL INJECTION DEVICE FOR INTERNAL COMBUSTION ENGINE

BACKGROUND OF THE INVENTION

1. Field of the Invention

The present invention relates to a fuel injection device for an internal combustion engine, which uses fuels, each having a different property, in particular, fuels, each containing alcohol at a different rate.

2. Description of the Related Art

The following fuel injection device for an internal combustion engine has been conventionally proposed. When a change in fuel property is detected, a fuel injection quantity is temporarily changed by canceling a limit condition for correction of the fuel injection quantity or expanding an allowable range of the correction. In addition, the fuel property is estimated based on a behavior of an air-fuel ratio, which is detected in an exhaust passage (for example, see JP 2003-120363 A).

According to the conventional fuel injection device for the internal combustion engine disclosed in JP 2003-120363 A, even if the fuel property has greatly changed, an optimal quantity of the fuel may be injected to be supplied, thereby preventing exhaust-gas emission performance from being deteriorated. Moreover, based on the behavior of the air-fuel ratio of an exhaust gas, which is caused by changing the fuel injection quantity, the fuel property may be estimated with high accuracy without providing an additional special sensor.

Moreover, another conventional fuel injection device for the internal combustion engine as follows has also been proposed. In this fuel injection device for the internal combustion engine, even when the estimation of a concentration of a single component in the fuel is inhibited based on an operating state, the estimation of the concentration of the single component in the fuel is allowed if the fuel correction quantity obtained based on the air-fuel ratio is out of a predetermined range (for example, see JP 2004-285972 A).

According to the another conventional fuel injection device for the internal combustion engine disclosed in JP 2004-285972 A, when the fuel correction quantity obtained based on the air-fuel ratio is out of the predetermined range, the estimation of the concentration of the single component in the fuel is allowed. Therefore, by using an estimated concentration value obtained by the estimation, operation performance or exhaust emission performance may be prevented from being deteriorated due to an insufficient correction quantity.

However, the prior art has the following problems. In the above-mentioned conventional fuel injection devices for the internal combustion engine, when a change occurs in the fuel property without being detected, the cancellation of the limit condition for the correction of the fuel injection quantity and the estimation of the fuel property are not performed. Therefore, appropriate control is not performed.

Moreover, as described in JP 2003-120363 A, the limit for the correction of the fuel injection quantity is for limiting the fuel injection quantity so as to prevent the occurrence of an abnormal change in the fuel injection quantity, in view of degradation of components of a fuel injection system such as an injector with elapse of time. When such a great change that the correction of the fuel injection quantity reaches the limit occurs, it is generally judged that the change is due to an abnormality occurring in the fuel injection system. Therefore, if the change in the correction of the fuel injection quantity due to the change in the fuel property is not appropriately controlled, it may be erroneously judged that the abnormality occurs in the fuel injection system.

For example, in the case where the change in the fuel property is detected based on refueling which is determined based on a change in a residual fuel quantity in a fuel tank, the refueling may not be detected because the change in the residual fuel quantity may not be sometimes detected depending on the degree of accuracy of a level sensor for the fuel tank when a small quantity is refueled. As a result, it is considered that the change in the fuel property is not detected either. At this time, if the residual fuel quantity in the fuel tank is large, it is considered that the fuel property is not affected much by the small quantity of refueling. If the residual fuel quantity in the fuel tank is small, however, the fuel property sometimes greatly changes. Therefore, if the control at the time of occurrence of the change in the fuel property is not appropriately performed, the deterioration of exhaust emission performance and insufficient combustion are caused. In addition, there is a fear that it may be erroneously judged that the abnormality has occurred in the fuel injection system. Moreover, for the fuel injection device which learns the amount of correction corresponding to a tolerance and deterioration of each of the components of the fuel system, there is a fear of performing erroneous learning because the correction of the fuel injection quantity based on the change in the fuel property is erroneously reflected to a leaning value.

In the case where the refueling is detected based on opening/closing of a fuel filler lid, it is difficult to immediately detect a failure because a sensor for detecting the opening/closing of the fuel filler lid is generally expected to have a simple structure. Once the failure is detected, it is considered that measures using alternative control or the like may be taken. Until the detection of the failure, however, the detection of the change in the fuel property is not performed in the same manner as described above. The same is applied to the detection of a failure of the level sensor of the fuel tank.

On the other hand, in the another conventional fuel injection device for the internal combustion engine disclosed in JP 2004-285972 A, the estimation of the concentration of the single component in the fuel is allowed when the fuel correction quantity obtained based on the air-fuel ratio is out of the predetermined range. Therefore, even when the air-fuel ratio is changed due to a factor other than the change in the fuel property, the concentration is estimated according to the fuel correction quantity determined based on the change in the air-fuel ratio. As a result, the concentration is erroneously estimated.

Moreover, in the fuel injection device disclosed in JP 2003-120363 A, which judges the occurrence of the abnormality in the fuel injection system when the correction of the injection quantity reaches the limit, the estimation of the concentration and the correction of the fuel injection quantity are performed even if the change in the air-fuel ratio occurs due to the abnormality of the fuel injection system, as described in JP 2004-285972 A. Therefore, even in such a case, it is not judged that the abnormality has occurred in the fuel injection system.

SUMMARY OF THE INVENTION

The present invention has been made in view of the problems described above, and has an object of providing a fuel injection device for an internal combustion engine, which calculates a fuel property correction value based on a correction value when a fuel correction value becomes out of a predetermined range even though fuel switching has not been detected and, in addition, it is judged that the change in the fuel correction value is due to a change in fuel property, thereby preventing estimation of the fuel property from being skipped and making an appropriate judgment of occurrence of an abnormality in the fuel injection system.

A fuel injection device for an internal combustion engine according to the present invention includes: an air-fuel ratio sensor for detecting an air-fuel ratio of an exhaust gas; target air-fuel ratio setting means for setting a target air-fuel ratio in accordance with an operating state of the internal combustion engine; air-fuel ratio detecting means for detecting an actual air-fuel ratio based on a detection signal of the air-fuel ratio sensor; fuel correction value calculating means for calculating a correction value for a fuel injection quantity so that the actual air-fuel ratio becomes equal to the target air-fuel ratio; fuel switching detecting means for detecting that fuel switching has occurred; fuel property estimating means for setting a period, in which there is a possibility that a fuel property changes, as a property change period when the fuel switching is detected by the fuel switching detecting means to calculate a fuel property correction value corresponding to another correction value for the fuel injection quantity based on the correction value within the property change period; and property change judging means for judging whether or not a change in the correction value is due to the change in the fuel property in a case where the correction value becomes out of a predetermined range even though the property change period is not set, in which the fuel property estimating means sets the property change period even when the property change judging means judges that the fuel property has changed.

According to the fuel injection device for the internal combustion engine of the present invention, upon detection of the fuel switching, the property change period is set to calculate the fuel property correction value based on the correction value in the property change period. In addition, even when it is judged that the fuel property has changed in the case where the correction value becomes out of the predetermined range even though the property change period has not been set, the property change period is set. Therefore, the fuel property may be estimated even when the fuel switching is not detected. In addition, the estimation of the fuel property is performed only during the property change period, and hence whether or not an abnormality has occurred in the fuel system may be appropriately judged.

DETAILED DESCRIPTION OF THE PREFERRED EMBODIMENTS

Hereinafter, preferred exemplary embodiments of a fuel injection device for an internal combustion engine according to the present invention are described with reference to the accompanying drawings.

First Embodiment

Figure 1:
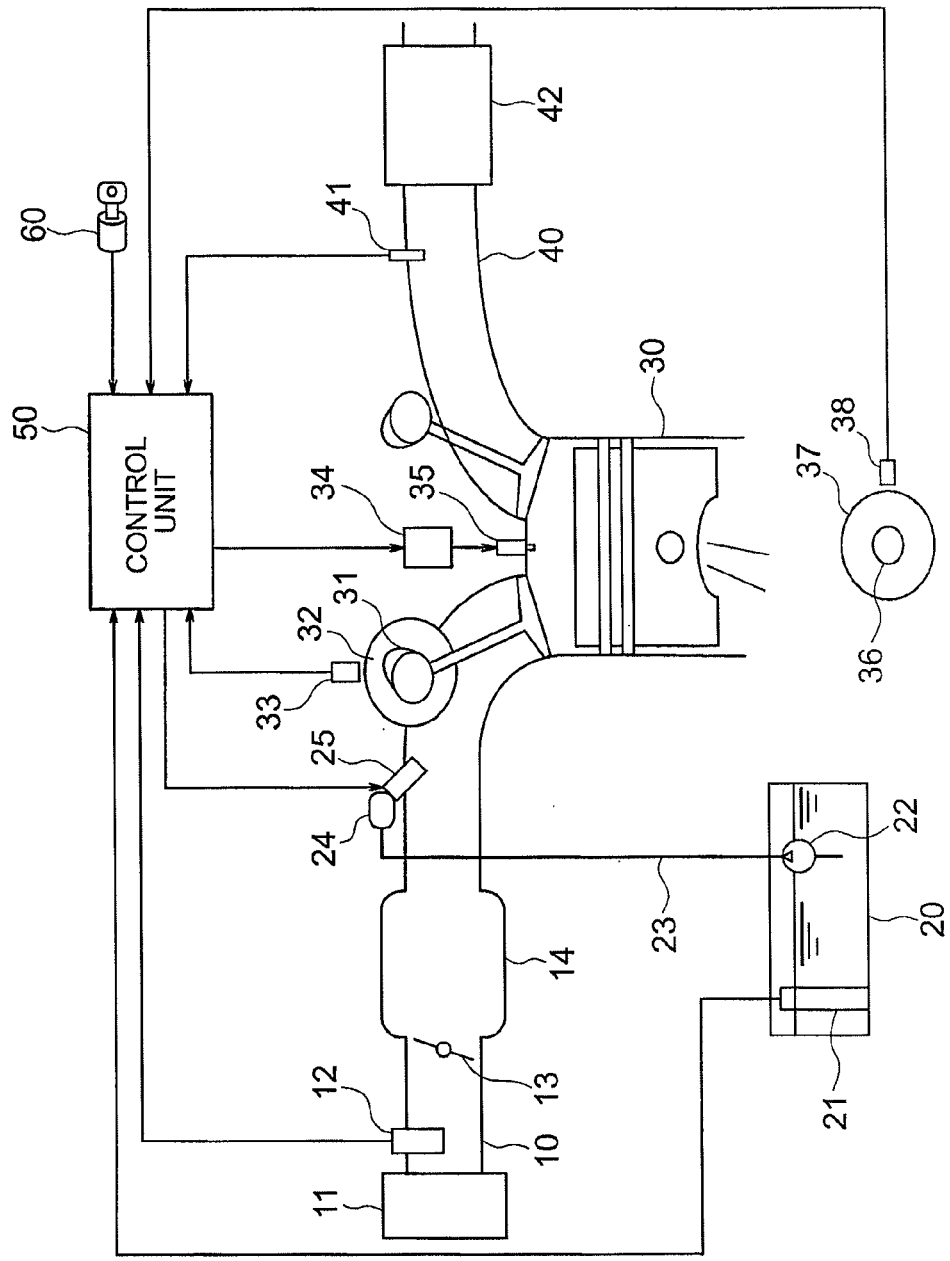
FIG. 1 is a diagram illustrating a configuration of an internal combustion engine according to a first embodiment of the present invention.

A fuel injection device for an internal combustion engine according to a first embodiment of the present invention is described with reference to FIGS. 1 to 10. FIG. 1 is a diagram illustrating a configuration of the internal combustion engine according to the first embodiment of the present invention. Hereinafter, the same reference numeral denotes the same or equivalent component in each of the drawings.

In FIG. 1, an intake pipe 10 is provided with: an air cleaner 11; an air flow sensor 12; a throttle valve 13; and a surge tank 14. The air cleaner 11 purifies an air taken into an internal combustion engine main body 30 described below. The air flow sensor 12 measures a quantity of the air taken into the internal combustion engine main body 30 (hereinafter, also referred to as an intake air quantity). The throttle valve 13 adjusts the intake air quantity.

A fuel tank 20 storing an alcohol-blended fuel supplied to the internal combustion engine main body 30 includes a fuel level sensor 21. Only a necessary quantity of the alcohol-blended fuel is discharged under a predetermined pressure by a fuel pump 22. The discharged fuel passes through a fuel pipe 23 having a returnless structure and a delivery pipe 24 to be supplied to a fuel injection valve 25. Then, the fuel is injected to each of cylinders of the internal combustion engine main body 30. The fuel injection valve 25 provided to each of the cylinders of the internal combustion engine main body 30 supplies the quantity of fuel according to an operating state of the internal combustion engine main body 30.

The internal combustion engine main body 30 includes: a cam shaft 31; a signal plate 32; and a sensor 33. The cam shaft 31 is coupled to a crank shaft 36 through an intermediation of mechanical transmission means such as a timing belt (not shown). The cam shaft 31 makes one revolution while the crank shaft 36 makes two revolutions. The signal plate 32 is mounted to the cam shaft 31. The sensor 33 detects a projection on the signal plate 32 to generate a cam signal. A cylinder position is obtained based on a combination of the cam signal and an SGT signal. An ignition plug 35 driven by an ignition coil 34 generates sparks with the application of a high voltage by the ignition coil 34, thereby combusting an air-fuel mixture in a combustion chamber.

Further, the crank shaft 36, a signal plate 37, and a crank angle sensor 38 are also provided to the internal combustion engine. The signal plate 37 is mounted to the crank shaft 36. The crank angle sensor 38 detects the projection on the signal plate 37 to generate the SGT signal corresponding to a crank angle signal. The SGT signal serves as a reference of timing of computation of the fuel injection quantity or the like. Moreover, a rotating speed of the internal combustion engine main body 30 may be obtained from a cycle of the SGT signal.

An exhaust pipe 40 for discharging an exhaust gas generated by combustion in the combustion chamber is provided with: an air-fuel ratio sensor 41 for detecting an air-fuel ratio of the exhaust gas; and a three-way catalyst 42 for purifying the exhaust gas.

The fuel level sensor 21, the air-fuel ratio sensor 41, the fuel injection valve 25, and the like are connected to a control unit 50 which includes a CPU, a memory, and the like. An ignition switch 60 turns ON/OFF power supplied from a battery (not shown) through a relay. For processing at the time of power-OFF, however, the power is still supplied to the control unit 50 for a predetermined time period of about several tens of seconds even after the ignition switch 60 is turned OFF.

Figure 2:
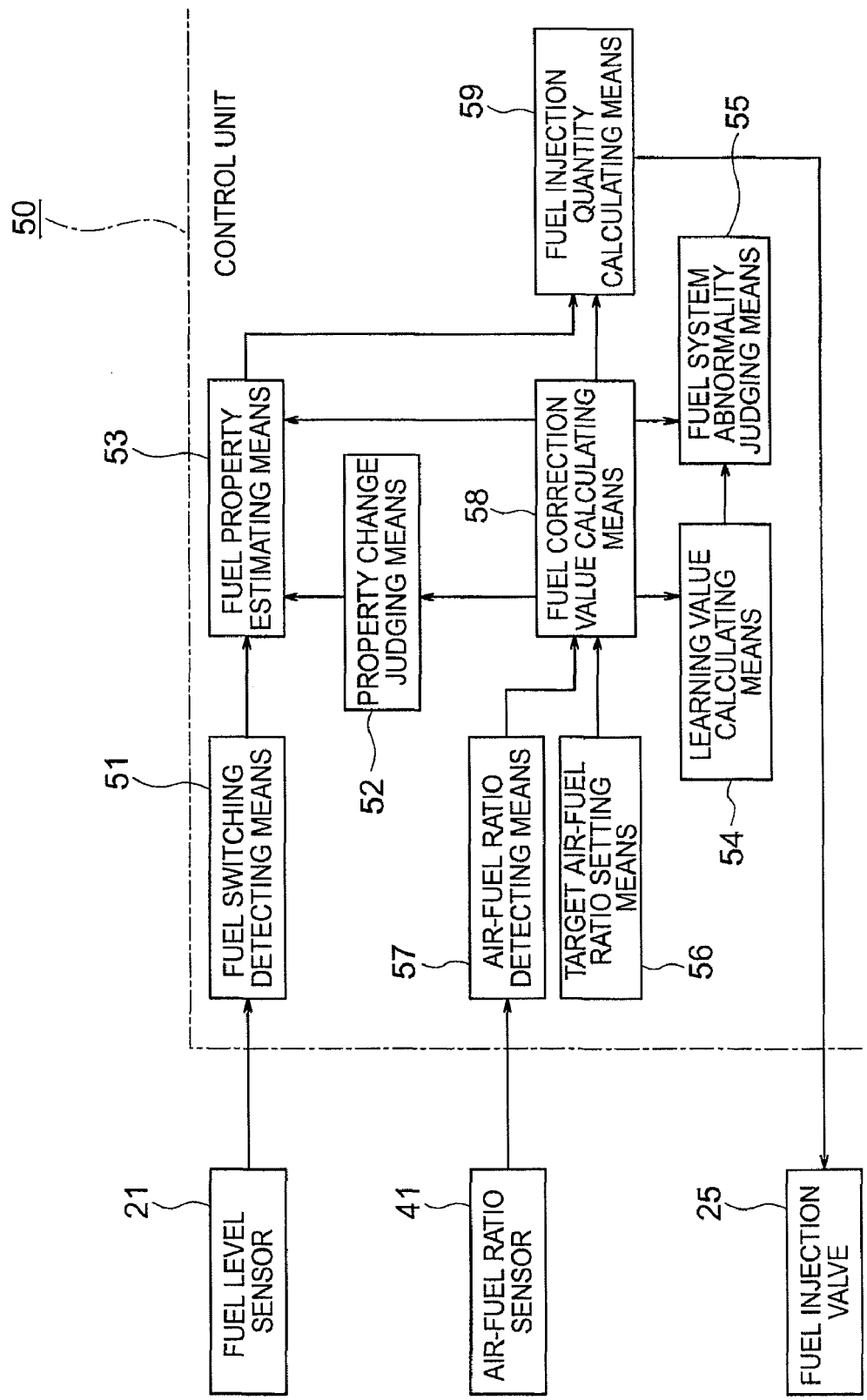
FIG. 2 is a block diagram illustrating a configuration of a fuel injection device for the internal combustion engine according to the first embodiment of the present invention.

FIG. 2 is a block diagram illustrating a configuration of the fuel injection device for the internal combustion engine according to the first embodiment of the present invention.

In FIG. 2, the control unit 50 includes: fuel switching detecting means 51; property change judging means 52; and fuel property estimating means 53. The fuel switching detecting means 51 judges that fuel switching has occurred when refueling is performed because there is a possibility that a fuel property has changed and detects the refueling based on a change in an output from the fuel level sensor 21. In the case where a correction value becomes out of a predetermined range, the property change judging means 52 judges that fuel property has changed when the quantity of fuel in the fuel tank is small at that time. When the fuel switching detecting means 51 judges that the fuel switching has occurred, the fuel property estimating means 53 sets a period, in which there is a possibility of occurrence of a change in fuel property, as a property change period. During the property change period, the fuel property estimating means 53 calculates a fuel property correction value corresponding to a correction value for the fuel injection quantity based on the correction value calculated by fuel correction value calculating means described below. Even when the property change judging means 52 judges that the fuel property has changed in the case where the correction value becomes out of the predetermined range even though it is not judged that the fuel switching has occurred and the property change period has not been set, the property change period is set. The details of the contents of processing are described below.

The control unit 50 also includes: learning value calculating means 54; and fuel system abnormality judging means 55. The learning value calculating means 54 calculates and stores an average value of the correction values under conditions where the internal combustion engine is stable as a learning value corresponding to a correction quantity for a tolerance and deterioration of each of components of a fuel system. The fuel system abnormality judging means 55 judges that an abnormality has occurred in the fuel system when the sum of the correction value calculated by the fuel correction value calculating means described below and the learning value calculated by the learning value calculating means 54 is out of a range of an abnormality judgment value. The abnormality judgment value is suitably determined in view of a change in the correction value due to the tolerance and deterioration of each of the components and a change in environmental conditions. For example, in the case where the range of the abnormality judgment value is determined to be ±30%, it is judged that the abnormality has occurred when the correction value exceeds 30% or becomes less than −30%. The range of the abnormality judgment value and the determination thereof are both known and known means may be used without any problem in this embodiment. Therefore, the details thereof are omitted in this embodiment.

The control unit 50 further includes: target air-fuel ratio setting means 56; air-fuel ratio detecting means 57; and fuel correction value calculating means 58. The target air-fuel ratio setting means 56 sets a target air-fuel ratio according to an operating state of the internal combustion engine. For example, the target air-fuel ratio setting means 56 sets the target air-fuel ratio to a theoretical air-fuel ratio in a normal operation zone, whereas the target air-fuel ratio setting means 56 sets the target air-fuel ratio to the rich side under a high load. The air-fuel ratio detecting means 57 detects an actual air-fuel ratio from a detection signal of the air-fuel ratio sensor 41. The fuel correction value calculating means 58 calculates the correction value for the fuel injection quantity so that the actual air-fuel ratio becomes equal to the thus set target air-fuel ratio. The range of the correction value is required to include a range which is used for the judgment of the abnormality, and hence the range of the correction value is set to ±30% when the correction value with no correction is zero. However, the range of the correction value is not limited thereto.

The control unit 50 also includes fuel injection quantity calculating means 59 for correcting a previously calculated correction value and the fuel property correction value for the calculated basic fuel injection quantity to calculate the fuel injection quantity. The fuel injection quantity calculating means 59 drives the fuel injection valve 25 based on the obtained fuel injection quantity to supply the fuel to the internal combustion engine main body 30. As a method of calculating the basic fuel injection quantity, the injection quantity obtained from the rotating speed and the intake air quantity of the internal combustion engine main body 30 is corrected so that the air-fuel ratio becomes the target air-fuel ratio calculated by the target air-fuel ratio setting means 56. In addition, the correction for increasing the injection quantity or the like is further performed immediately after start, when a water temperature is low or the like. The calculation method and the correction used therein are both known, and known means is used without any problem in this embodiment. As a correction method used in the fuel injection quantity calculating means 59, the correction value calculated by the fuel correction value calculating means 58 and the fuel property correction value calculated by the fuel property estimating means 53 are suitably reflected to the basic fuel injection amount by using a method similar to various conventional correction methods. Therefore, the details thereof are herein omitted.

Next, an operation of the fuel injection device for the internal combustion engine according to the first embodiment of the present invention is described with reference to the drawings.

Figure 3:
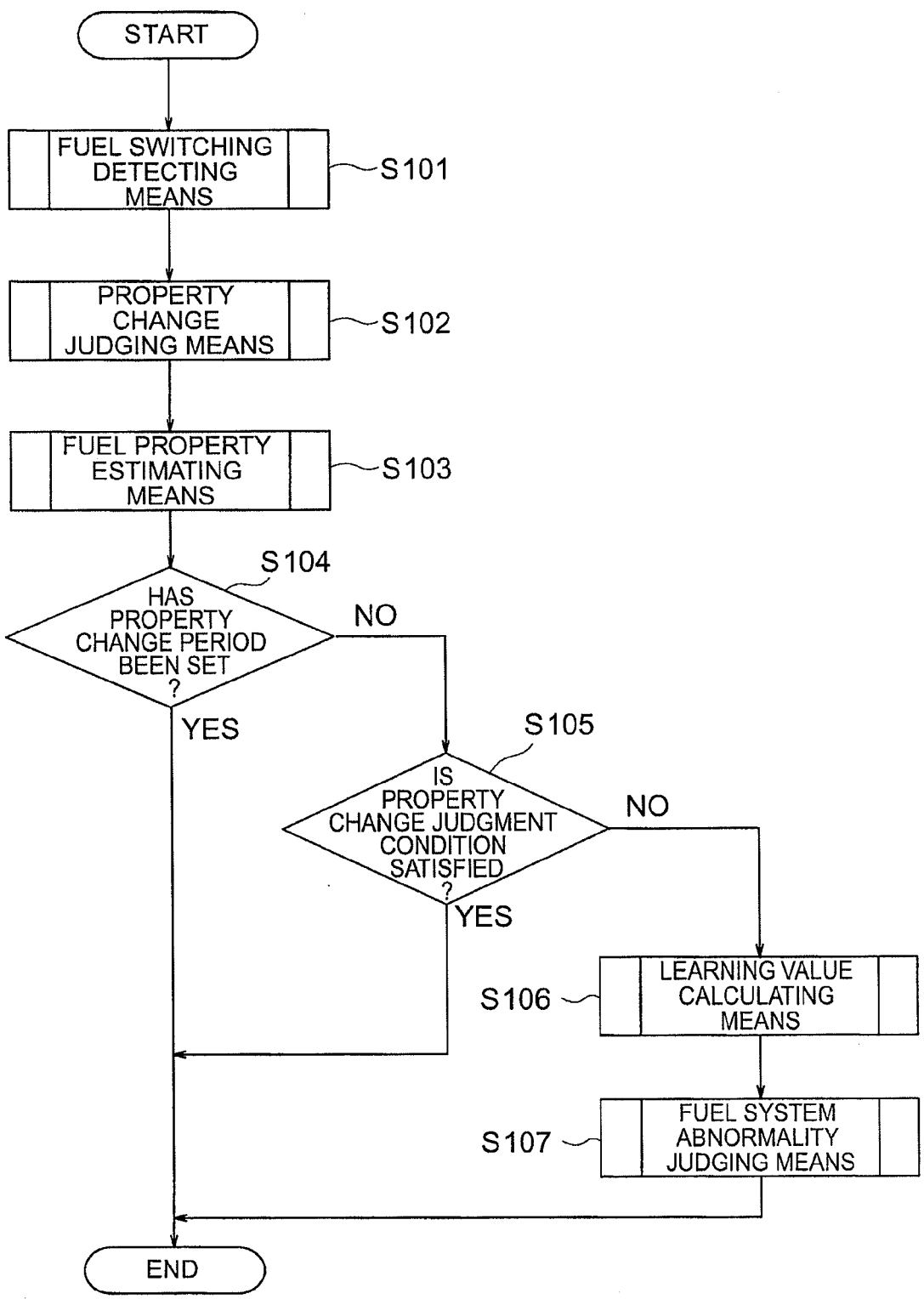
FIG. 3 is a flowchart illustrating processing executed by a control unit of the fuel injection device for the internal combustion engine according to the first embodiment of the present invention in a cycle of 0.01 second.
Figure 4:
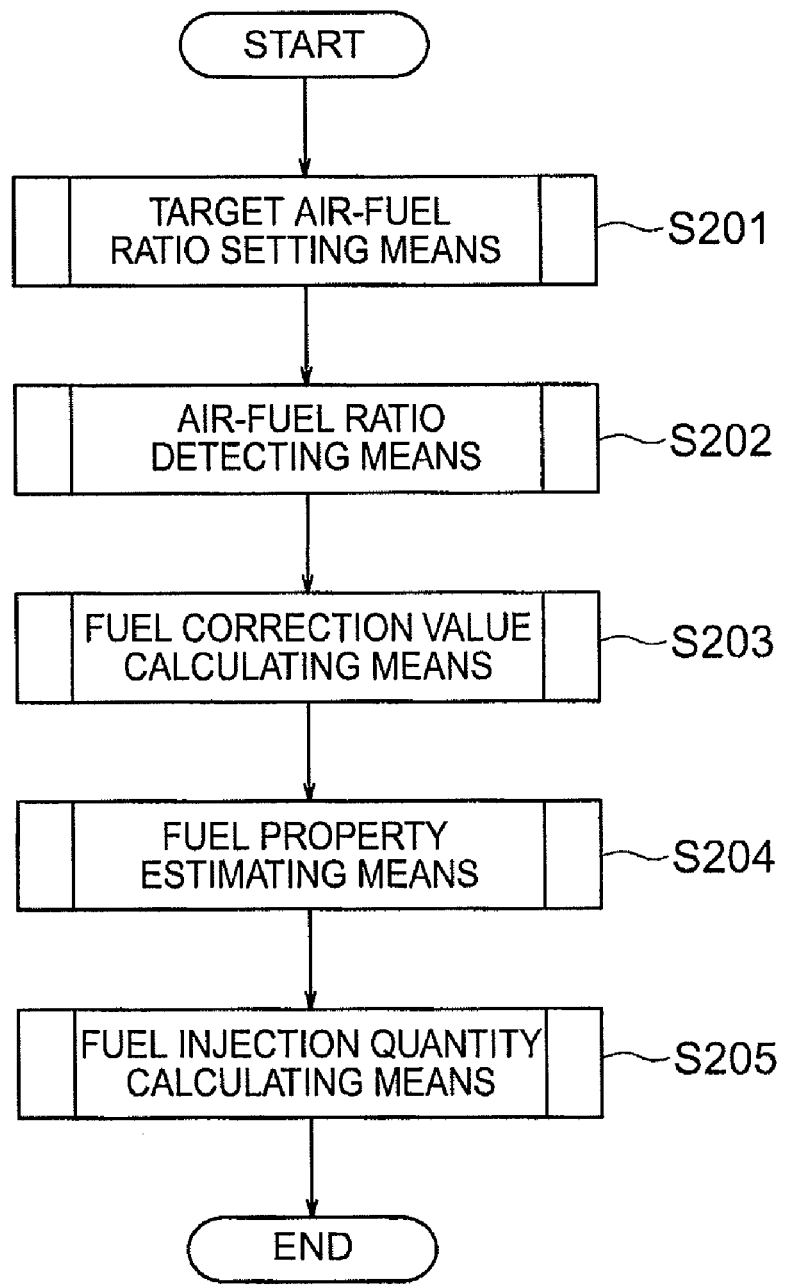
FIG. 4 is a flowchart illustrating processing executed by the control unit of the fuel injection device for the internal combustion engine according to the first embodiment of the present invention in synchronization with an SGT signal.
Figure 5:
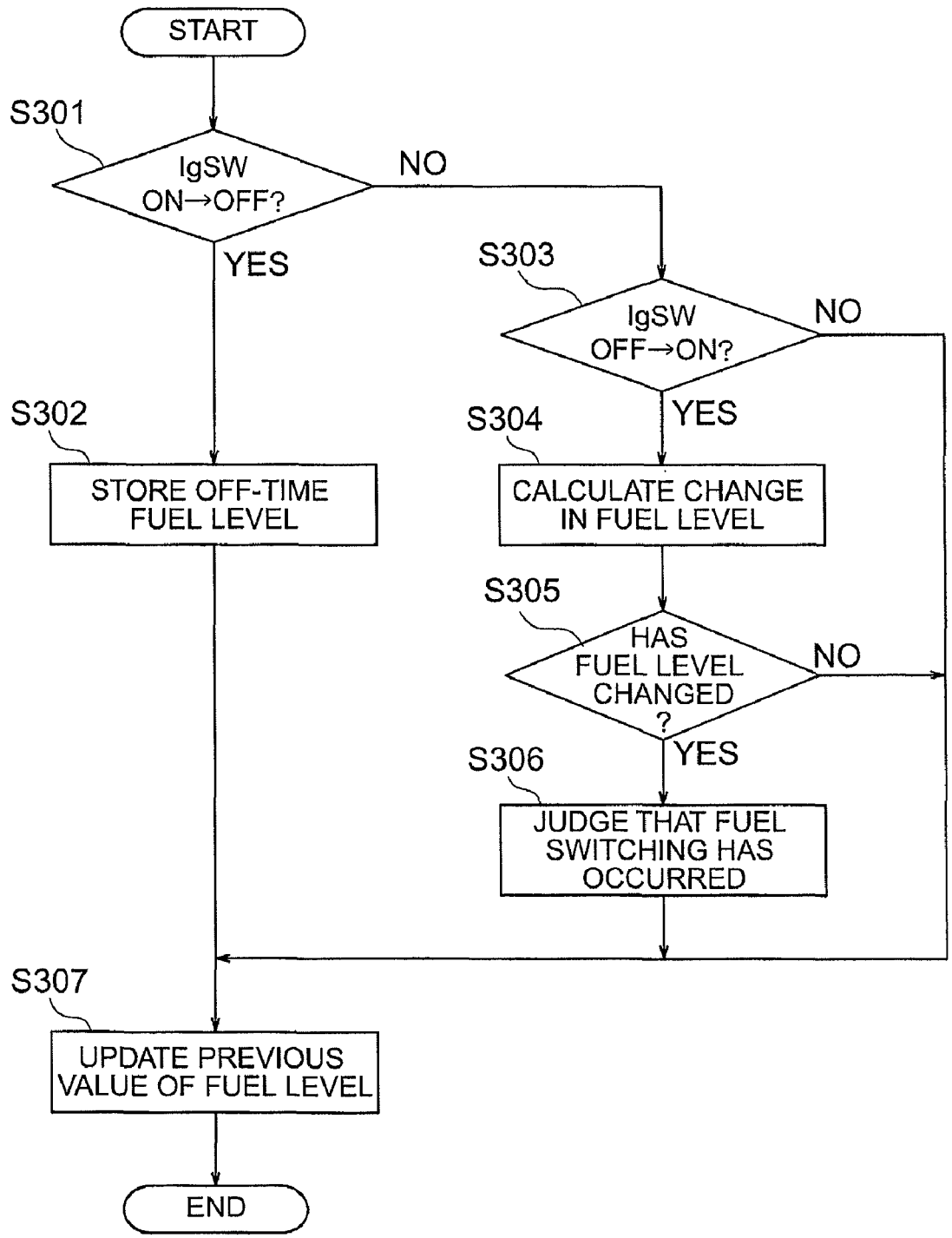
FIG. 5 is a flowchart illustrating processing of fuel switching detecting means of the fuel injection device for the internal combustion engine according to the first embodiment of the present invention.
Figure 6:
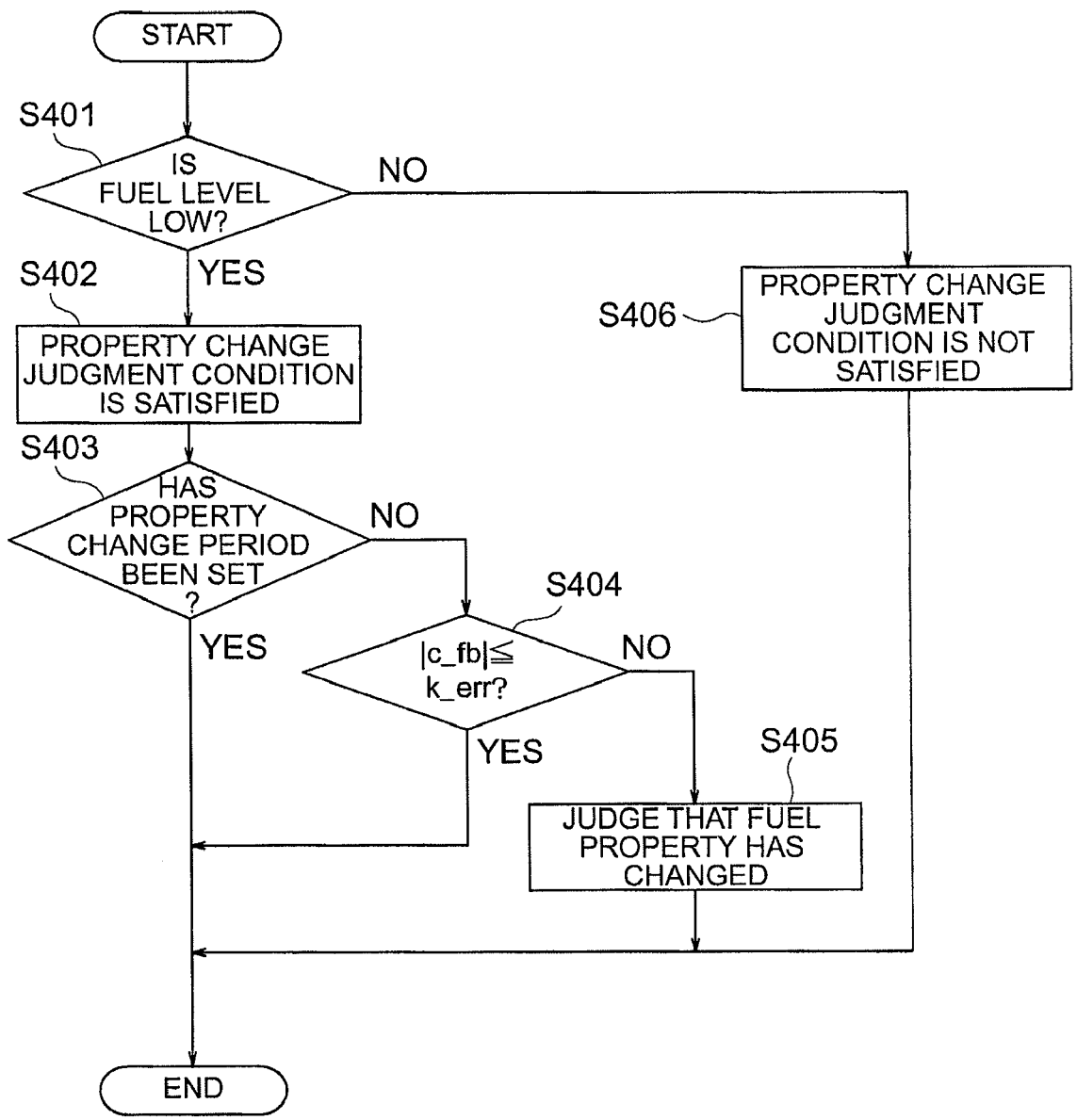
FIG. 6 is a flowchart illustrating processing of property change judging means of the fuel injection device for the internal combustion engine according to the first embodiment of the present invention.
Figure 7:
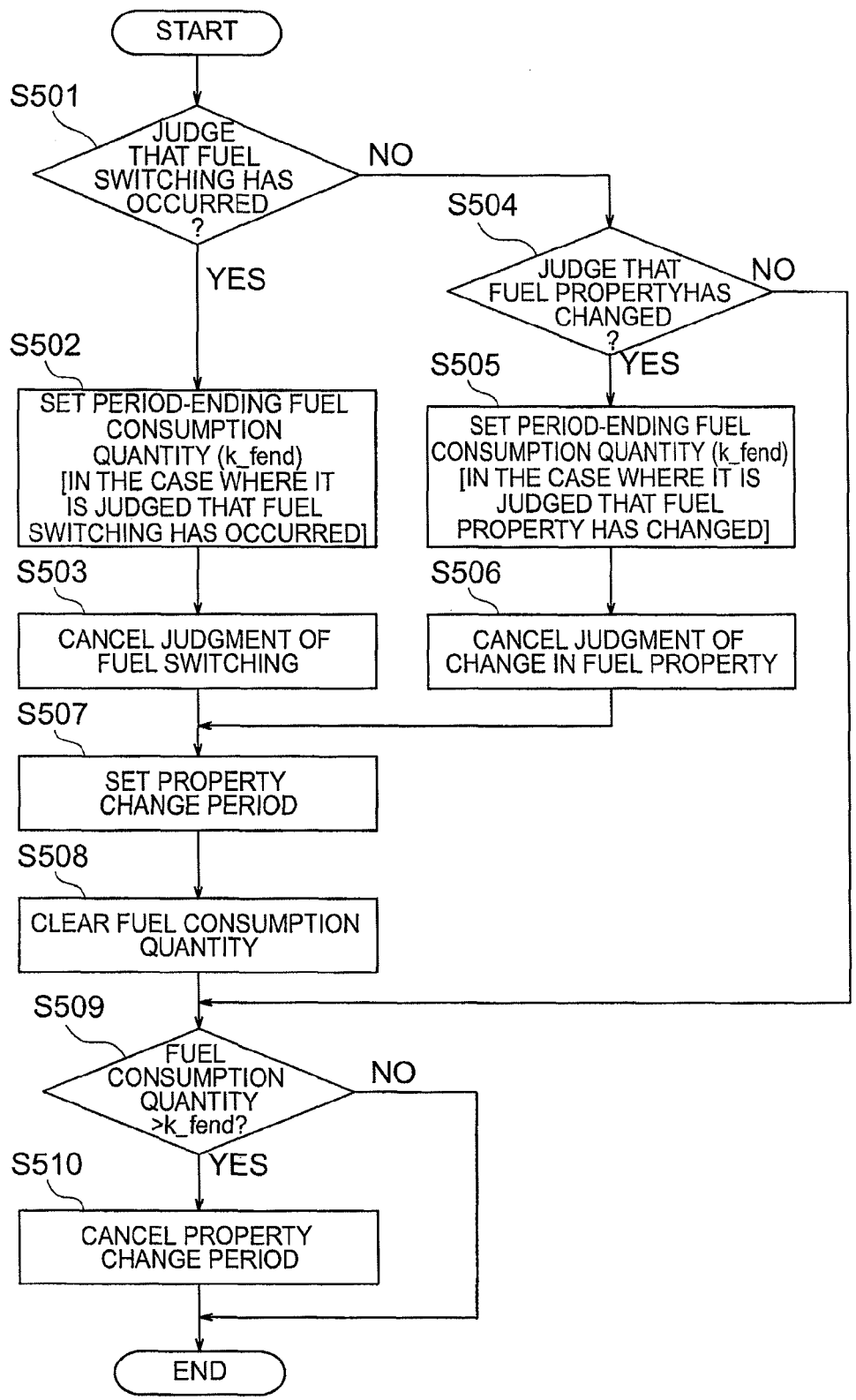
FIG. 7 is a flowchart illustrating processing of fuel property estimating means of the fuel injection device for the internal combustion engine according to the first embodiment of the present invention.
Figure 8:
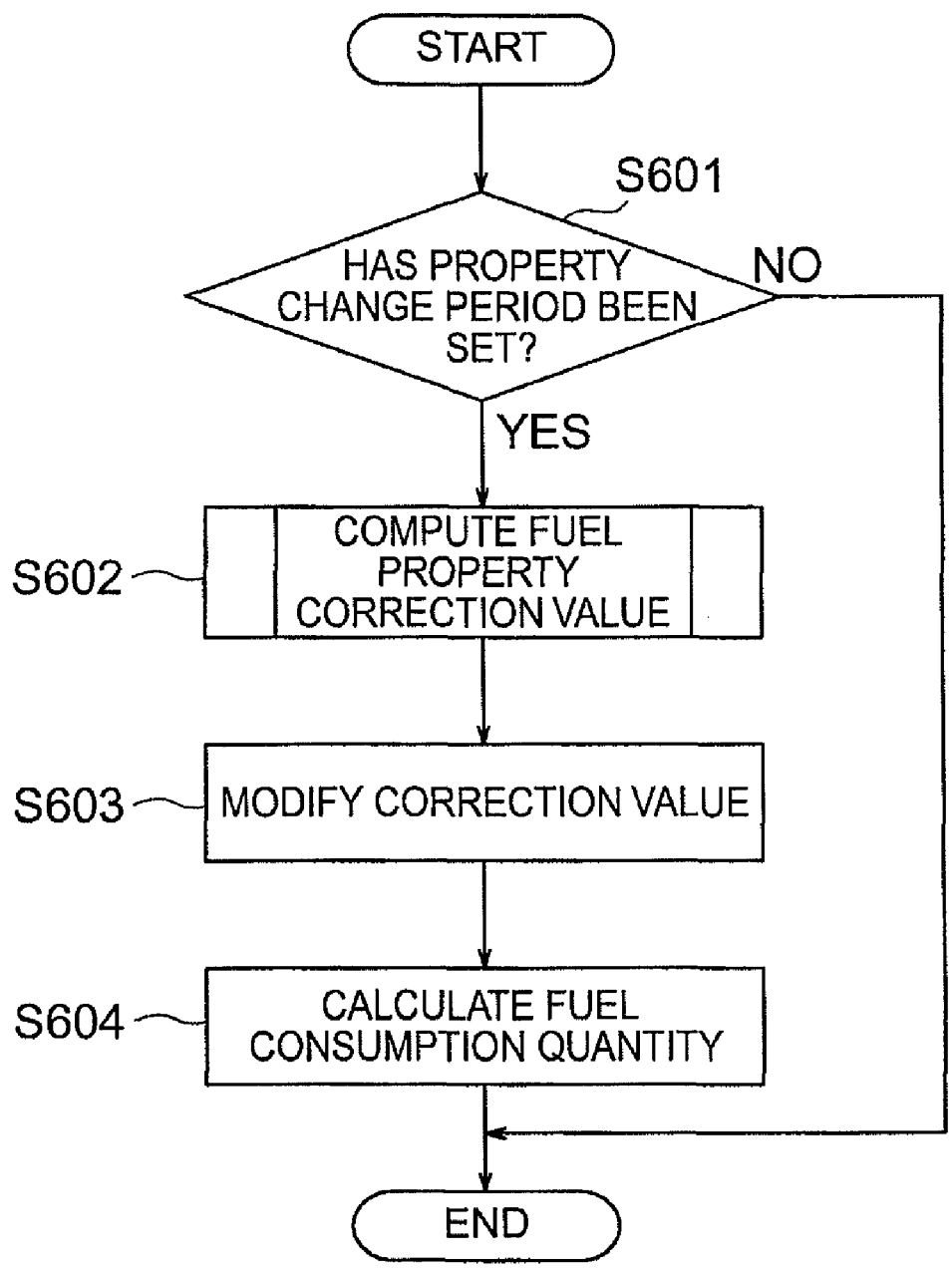
FIG. 8 is a flowchart illustrating SGT signal synchronization processing of the fuel property estimating means of the fuel injection device for the internal combustion engine according to the first embodiment of the present invention.
Figure 9:
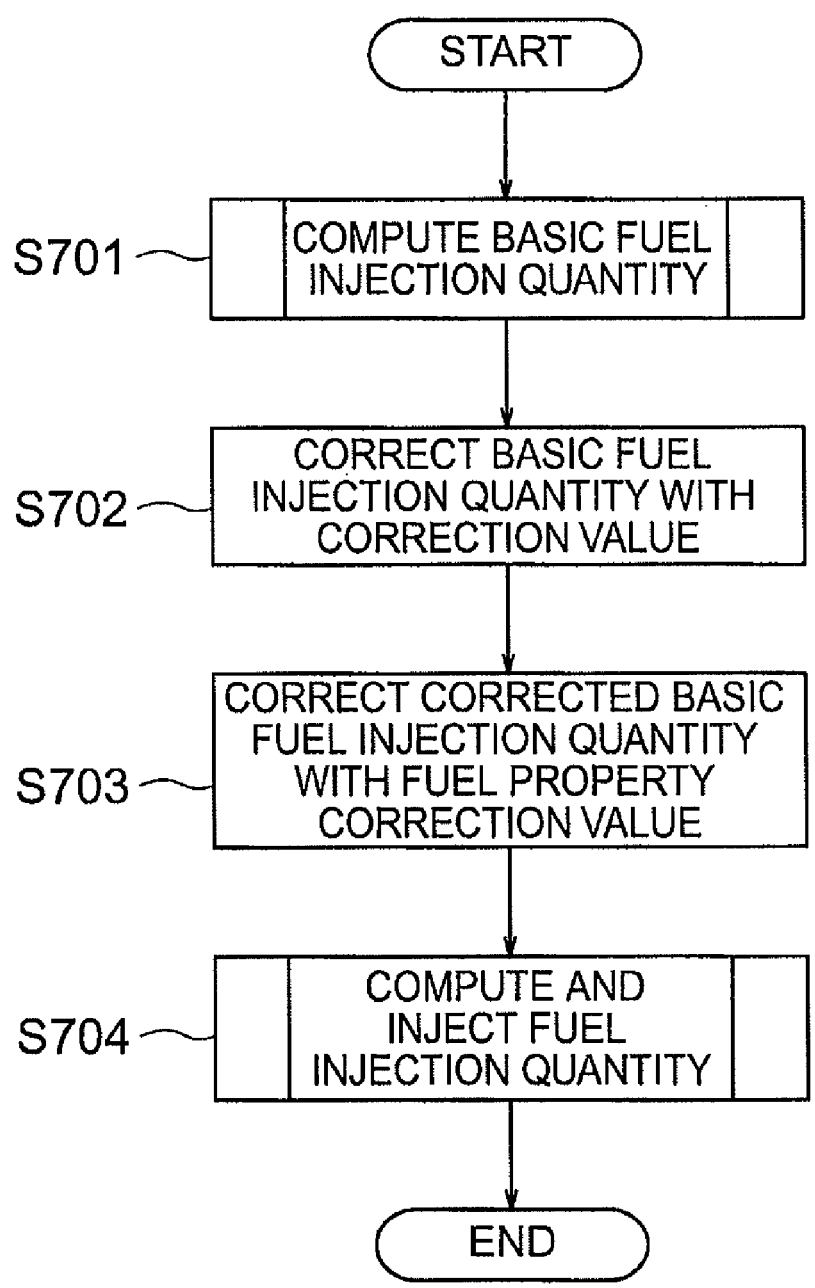
FIG. 9 is a flowchart illustrating processing of fuel injection quantity calculating means of the fuel injection device for the internal combustion engine according to the first embodiment of the present invention.

FIG. 3 illustrates means executed in a constant cycle of 0.01 second, whereas FIG. 4 illustrates means executed in synchronization with the SGT signal. FIG. 5 illustrates processing performed by the fuel switching detecting means 51 in the constant cycle of 0.01 second, FIG. 6 illustrates processing performed by the property change judging means 52 in the constant cycle of 0.01 second, FIG. 7 illustrates processing performed by the fuel property estimating means 53 in the constant cycle of 0.01 second, FIG. 8 illustrates processing performed by the fuel property estimating means 53 in synchronization with the SGT signal, and FIG. 9 illustrates processing performed by the fuel injection quantity calculating means 59 in synchronization with the SGT signal. Hereinafter, the reference symbol S denotes each processing step.

In Step S101 illustrated in FIG. 3, the CPU of the control unit 50 executes the processing of the fuel switching detecting means 51 illustrated in FIG. 5.

Next, in Step S102, the processing of the property change judging means 52, which is illustrated in FIG. 6, is executed.

Next, in Step S103, the processing of the furl property estimating means 53, which is illustrated in FIG. 7, is executed.

Next, in Step S104, when the property change period is set, the processing performed in the 0.01-second cycle (hereinafter, referred to as the 0.01-second cycle processing) is terminated.

Next, in Step S105, when a condition for judging the occurrence of the change in the fuel property (hereinafter, referred to as "a property change judgment condition") is satisfied, the 0.01-second cycle processing is terminated.

When the property change period is not set and the property change judgment condition is not satisfied, the known processing of the learning value calculating means 54 is executed in Step S106.

Next, in Step S107, the known processing of the fuel system abnormality judging means 55 is executed. Then, the 0.01-second cycle processing is terminated.

Known processing of the target air-fuel ratio setting means 56 is performed in Step S201 illustrated in FIG. 4, known processing of the air-fuel ratio detecting means 57 is performed in Step S202 illustrated in FIG. 4, and known processing of the fuel correction quantity calculating means 58 is performed in Step S203 illustrated in FIG. 4, thereby calculating the correction value.

Based on the obtained correction value, the processing of the fuel property estimating means 53, which is illustrated in FIG. 8, is executed in Step S204, and the processing of the fuel injection quantity calculating means 59, which is illustrated in FIG. 9, is executed in Step S205. Then, the SGT signal synchronization processing is terminated.

First, in Step S303 illustrated in FIG. 5, the fuel switching detecting means 51 judges whether or not a state of the ignition switch (IgSW) 60 has changed from ON to OFF. If the state of the ignition switch 60 has changed from ON to OFF (YES), the processing proceeds to Step S302. If not (NO), the processing proceeds to Step S303.

Next, in Step S302, a previous value of the fuel level, which is updated in previously executed Step S307, is stored as an OFF-time fuel level in a backup area which is capable of retaining a value even without energization. After that, the processing proceeds to Step S307.

In Step S303, it is judged whether or not a state of the ignition switch (IgSW) 60 has changed from OFF to ON. If the state of the ignition switch 60 has changed from OFF to ON (YES), the processing proceeds to Step S304. If not (NO), specifically, if the state of the ignition switch 60 has not changed, the processing directly proceeds to Step S307.

Next, in Step S304, a difference between a fuel level at this time, which is detected by the fuel level sensor 21, and the stored OFF-time fuel level is calculated as a change in fuel level.

Next, in Step S305, it is judged whether or not there is any change in the fuel level. If there is the change in the fuel level (YES), the processing proceeds to Step S306. If not (NO), the processing proceeds to Step S307.

Next, in Step S306, it is judged that the fuel switching has occurred. After that, the processing proceeds to Step S307.

In Step S307, after the previous value of the fuel level is updated, the processing is terminated. The previous value of the fuel level is used in Step S302 as described above. The previous value of the fuel level is for keeping the value while the ignition switch 60 is ON because the ignition switch 60 is in the OFF state in Step S302.

Although the above-mentioned processing is performed in the first embodiment because the ignition switch 60 is normally placed in the OFF state during the refueling, whether or not the refueling has been performed may also be judged during the operation of the internal combustion engine while the ignition switch 60 is in the ON state. In this case, whether or not the change has occurred in the fuel level is suitably judged using the fuel level immediately after stop of a vehicle as a reference.

First, in Step S401 illustrated in FIG. 6, the property change judging means 52 judges whether or not the fuel level is low. For a criterion of judgment of the low fuel level, the following may be considered. In the case where a minimum refueling quantity which allows the judgment that the fuel switching has occurred to be made is three liters in the fuel switching detecting means 51, it is assumed that an alcohol concentration of the fuel in the fuel tank 20 is 0% and the alcohol concentration in a refueled fuel is 100%. Then, when the quantity of fuel in the fuel tank 20 is nine liters and the quantity of refueled fuel is three liters, the alcohol concentration changes from 0% to 25%. Therefore, the correction value is changed by about 15%. Here, if the quantity of fuel in the fuel tank 20 is larger than nine liters, the correction value is not changed by 15% or larger. On the other hand, if the quantity of refueled fuel exceeds three liters, it is judged by the fuel switching detecting means 51 that the fuel switching has occurred. Therefore, the judgment of the fuel level is not required in this case. Thus, in this case, if the fuel level is judged as being low when the quantity of fuel in the fuel tank 20 is equal to or less than twelve liters, the change in the correction value due to the change in the alcohol concentration in the case where the property change period is not set may be kept to 15% or less.

If the fuel level of the fuel in the fuel tank 20 is low (YES), the processing proceeds to Step S402. If not (NO), the processing proceeds to Step S406.

Next, in Step S402, there is a possibility that a small quantity which does not allow the judgment of the fuel switching to be performed has been refueled, and hence it is determined that there is a possibility that the correction value may be changed due to the change in the fuel property, whereby the property change judgment condition is satisfied.

Next, in Step S403, it is judged whether or not the property change period has been set. If the property change period has already been set (YES), the processing is terminated without any further steps because the judgment of the change in the fuel property by the property change judging means 52 is not required. If not (NO), the processing proceeds to Step S404.

In Step S404, if the property change period has not been set, it is judged whether or not a correction value ($c\_fb$) is within a predetermined range ($k\_err$). A value of the predetermined range (k_err) is suitably set to a value which does not allow the judgment that the fuel property has changed to be made if the value fluctuates in a short term because the tolerance and the deterioration of each of the components of the fuel system are normally retained in the learning value. In addition, the predetermined range is suitably set to a range which does not affect normal control even if the property change period is not set. Thus, the value of the predetermined range is set to 15%. If the correction value (c_fb) is within the predetermined range (k_err) (YES), the processing is terminated without any further steps. If the correction value (c_fb) is out of the predetermined range (k_err) (NO), the processing proceeds to Step S405.

In Step S405, the correction value has been changed due to the change in the fuel property, and hence it is judged that the fuel property has changed. Then, the processing is terminated.

On the other hand, if the fuel level is not low in Step S401, it is determined in Step S406 that the property change judgment condition is not satisfied. Then, the processing is terminated.

First, in Step S501 illustrated in FIG. 7, the fuel property estimating means 53 judges whether or not the fuel switching has occurred. If it is judged that the fuel switching has occurred (YES), the processing proceeds to Step S502. If not (NO), the processing proceeds to Step S504.

Next, in Step S502, a fuel consumption quantity for ending the property change period is set.

Next, in Step S503, the judgment of the fuel switching is cancelled. After that, the processing proceeds to Step S507.

If it is not judged that the fuel switching has occurred, it is judged in Step S504 whether or not the fuel property has changed. If it is judged that the fuel property has changed (YES), the processing proceeds to Step S505. If not (NO), the processing proceeds to Step S509. Specifically, if it is not judged that the fuel property has changed either, the property change period is not set. Therefore, the processing proceeds to Step S509.

Next, in Step S505, a fuel consumption quantity for ending the property change period is set.

Next, in Step S506, the judgment of whether or not the fuel property has changed is cancelled. After that, the processing proceeds to Step S507.

Figure 10:
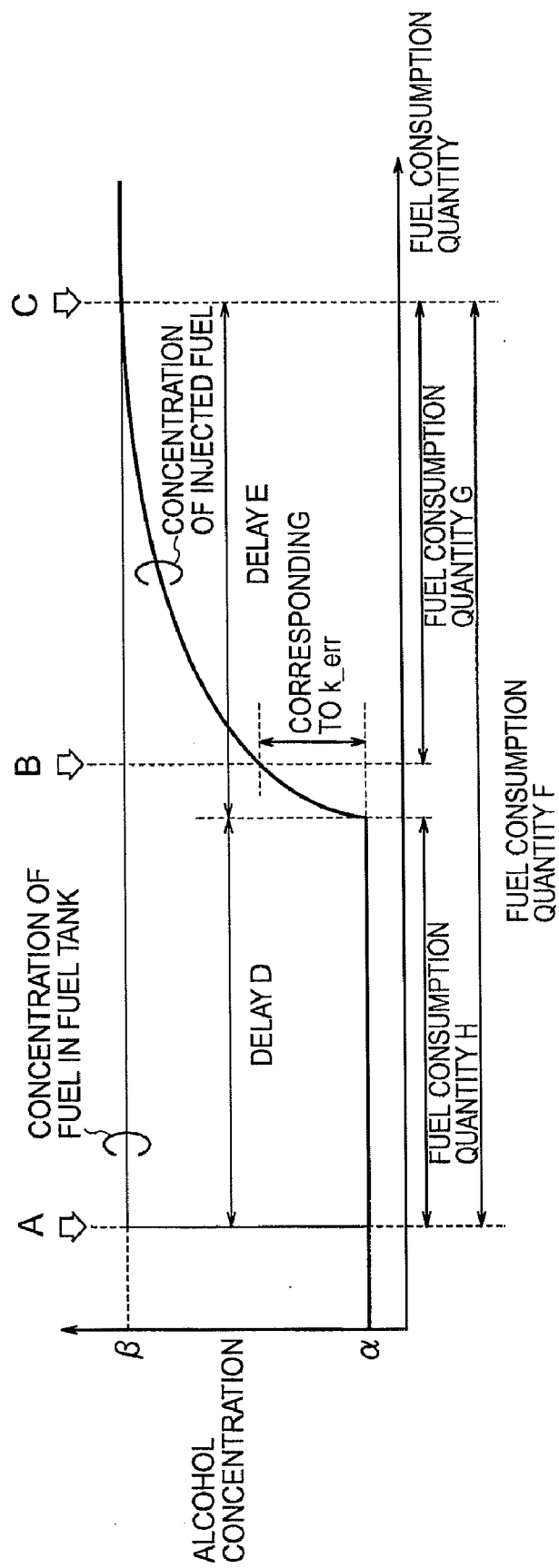
FIG. 10 is a graph illustrating a behavior of an alcohol concentration of a fuel for the fuel injection device for the internal combustion engine according to the first embodiment of the present invention.

Here, a period-ending fuel consumption quantity (k_end) which allows the property change period set in Step S502 or S505 to be ended is described with reference to FIG. 10. FIG. 10 illustrates a behavior of an alcohol concentration in the fuel at the time of refueling using the fuel consumption quantity as a reference.

In FIG. 10, $\alpha$ represents the alcohol concentration before the refueling, whereas $\beta$ represents the alcohol concentration after the refueling. A point A indicates a time at which the refueling is performed. When the fuel switching detecting means 51 detects the refueling, it is judged at the point A that the fuel switching has occurred. A point B is a point at which the property change judging means 52 judges that the fuel property has changed based on the change in the correction value which varies according to the change in the alcohol concentration if it is not judged that the fuel switching has occurred and the fuel level is low. A point C is a point at which the alcohol concentration of the injected fuel becomes equal to the alcohol concentration $\beta$ of the fuel in the fuel tank 20 after the refueling, and therefore, the property change period is ended.

In the fuel tank 20, the fuel in the fuel tank and the refueled fuel are substantially uniformly mixed with each other owing to a flow of the fuel at the time of refueling or the like. Therefore, the alcohol concentration of the fuel in the fuel tank 20 quickly becomes $\beta$, at the point A. However, the fuel system has the returnless structure, and hence the alcohol concentration of the injected fuel supplied to the internal combustion engine main body 30 becomes $\beta$ at the point C due to delays as illustrated in FIG. 10. Each of delays D and E corresponding to a period A to C is determined based on the fuel consumption quantity as a reference. The delay D is a fuel transfer delay between the fuel tank 20 to the delivery pipe 24, and therefore, corresponds to the fuel consumption quantity for a volume of the fuel pipe 23 which is present between the fuel tank 20 and the delivery pipe 24.

The delay E is a fuel mixture delay in the delivery pipe 24, specifically, a delay generated when the fuel having the alcohol concentration a before the refueling, which remains in the delivery pipe 24, and the fuel having the alcohol concentration 13 supplied after the refueling are mixed with each other in the delivery pipe 24. The delay E is greatly affected by a volume of the delivery pipe 24.

The fuel having the alcohol concentration $\beta$ is supplied to the delivery pipe 24 with the earlier delay D for the fuel consumption quantity after the refueling. The mixture also demonstrates a behavior substantially according to the fuel consumption quantity. Therefore, the alcohol concentration of the injected fuel supplied to the internal combustion engine main body 30 behaves according to the fuel consumption quantity as indicated by a thick line illustrated in FIG. 10.

From the fact described above, the fuel consumption quantity which allows the property change period to be ended is set as follows. When it is judged that the fuel switching has occurred, a fuel consumption quantity F obtained by adding the delays D and E, which corresponds to the period A to C, is set as the above-mentioned period-ending fuel consumption quantity (k_end). On the other hand, when it is judged that the fuel property has changed, a fuel consumption quantity G obtained by subtracting a consumption quantity for the judgment of the change in the correction value from the delay E, which corresponds to the period B to C, is set as the above-mentioned period-ending fuel consumption quantity (k_end). Further, it is expected that the change in the alcohol concentration is varied. In particular, the position of the point B is advanced or delayed depending on the relation of the alcohol concentrations $\alpha$ and $\beta$. Therefore, it is recommended that a margin be provided to set each of the fuel consumption quantities F and G.

In FIG. 7, if it is judged that the fuel switching has occurred or the fuel property has changed, the property change period is set in Step S507. Then, in Step S508, the fuel consumption quantity which is used to judge whether or not to end the property change period is cleared.

In Step S509, it is judged whether or not the fuel consumption quantity has exceeded the period-ending fuel consumption quantity (k_end) so as to judge whether or not to end the property change period. If the fuel consumption quantity has exceeded the period-ending fuel consumption quantity (k_end) (YES), the processing proceeds to Step S510. On the other hand, if not (NO), the property change period is continued. Therefore, the processing is terminated without any further steps.

In Step S510, the property change period is ended. Thus, after the property change period is cancelled, the processing is terminated.

On the other hand, FIG. 8 illustrates the SGT signal synchronization processing corresponding to the processing performed by the fuel property estimating means 53. In Step S601, the fuel property estimating means 53 judges whether or not the property change period has been set. If the property change period has been set (YES), the processing proceeds to Step S602. If not (NO), the fuel property is not estimated. Therefore, the processing is terminated without any further steps.

Next, in Step S602, if the property change period has been set, the estimation of the fuel property or the like is performed. Therefore, the fuel property correction value is computed based on the correction value.

As a method of calculating the correction value used for the fuel property correction value, a method used for known computation of the learning value or the like for preventing a variation due to a fluctuation is suitably used. Specifically, the correction value is suitably obtained based on an average value of the correction values over a predetermined number of the SGT signals. However, the change in the correction value depending on the fuel property is relatively large, and hence it is suitable to set the period shorter than that used for conventional learning, which corresponds to the average value of the correction values over thirty three SGT signals. Then, the fuel property correction value is updated by reflecting the obtained average value to the fuel property correction value before the computation.

Assuming that the fuel property correction value when the fuel containing no ethanol (fuel containing gasoline at 100%) is 1.0, the fuel property correction value is about 1.6 when the fuel containing ethanol at 100% is used because a theoretical air-fuel ratio of ethanol is about 9. Therefore, the fuel property correction value ranges from 1.0 to about 1.6 depending on the alcohol concentration. When the alcohol concentration is required to be obtained, the alcohol concentration may be calculated from the fuel property correction value based on the above-mentioned relation.

Next, in Step S603, the correction value is modified according to the amount of change in the fuel property correction value. The correction value has been reflected to the fuel property correction value. Therefore, if the fuel property correction value is calculated while the correction value is retained, the correction value is doubly corrected. Therefore, this step is performed to prevent the double correction described above.

Then, in Step S604, the fuel consumption quantity used for judging whether or not to end the property change period is calculated. Then, the processing is terminated. The fuel consumption quantity is obtained by integrating the fuel injection quantities during the processing cycle described above.

In Step S701 illustrated in FIG. 9, the fuel injection quantity calculating means 59 computes the basic fuel injection quantity. The computation of the basic fuel injection quantity may be known one as described above.

Next, the thus calculated basic fuel injection quantity is corrected with the correction value in Step S702, and then, with the fuel property correction value in Step S703.

Then, in Step S704, the fuel injection valve 25 is driven based on a final fuel injection quantity obtained by performing known transient correction or the like on the corrected fuel injection quantity. Then, the processing is terminated.

As described above, according to the first embodiment, when the fuel switching is detected, the property change period is set. The fuel property correction value is calculated based on the correction value in the property change period. In addition, even when it is judged that the fuel property has changed in the case where the correction value becomes out of the predetermined range even though the property change period has not been set, the property change period is set. Therefore, the fuel property may be estimated even when the fuel switching is not detected. In addition, whether or not the abnormality has occurred in the fuel system may be appropriately judged because the fuel property may be estimated only during the property change period.

Further, the calculation of the learning value and the judgment of the occurrence of the abnormality in the fuel system are not performed when there is a possibility that the correction value is changed due to the change in the fuel property, and hence erroneous learning or erroneous judgment of the occurrence of the abnormality in the fuel system due to the change in the correction value until the completion of the estimation of the fuel property may be prevented.

Further, in the case where the fuel switching is detected based on the refueling determined by the change in the fuel level of the fuel in the fuel tank 20, it is judged that the fuel property has changed when the correction value becomes out of the predetermined range, and in addition, the quantity of fuel in the fuel tank 20 is small at that time. Thus, even if the change in the fuel level may not be detected, and therefore, the fuel switching is not detected because of low accuracy of the fuel level sensor 21 for the fuel tank 20, the property change period may be set.

Second Embodiment

Figure 11:
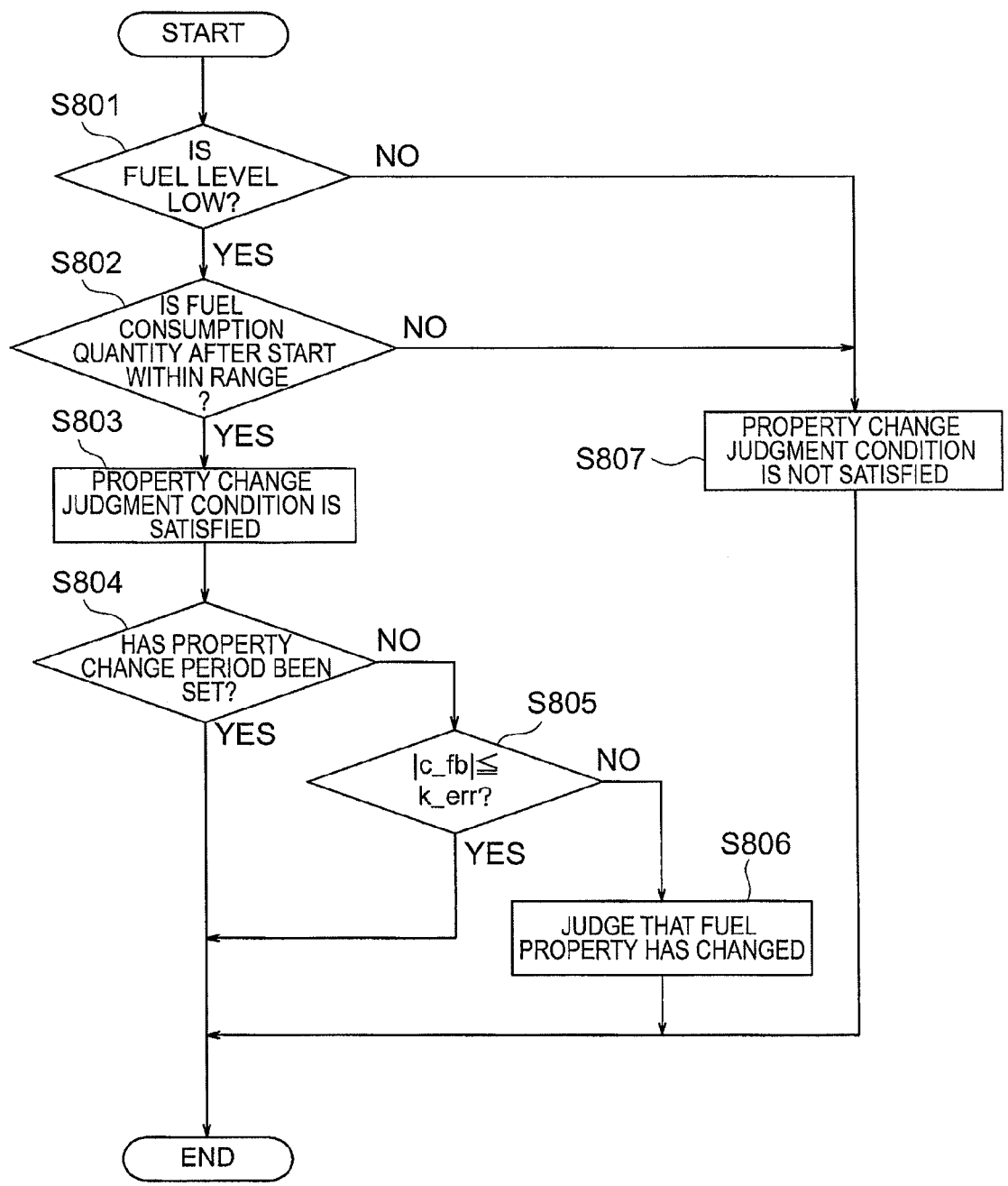
FIG. 11 is a flowchart illustrating processing of property change judging means of a fuel injection device for an internal combustion engine according to a second embodiment of the present invention.

The fuel injection device for the internal combustion engine according to a second embodiment of the present invention is described with reference to FIG. 11.

In the first embodiment describe above, in the case where the correction value becomes out of the predetermined range, the property change judging means 52 judges that the fuel property has changed when the quantity of fuel in the fuel tank 20 is small at that time. In the case where the fuel system has the returnless structure, however, the property change judging means 52 may also judge the fuel property has changed even when the fuel consumption quantity after the start at that time is within a preset range of the fuel consumption quantity.

In FIG. 10 to which the reference has been made in the above-mentioned first embodiment, the point B is away from the point A after the refueling by at least the delay D. Moreover, the change in the alcohol concentration terminates at the point C, and hence the point B is present within the range of the delay E. From this fact, whether or not the fuel property has changed is suitably judged only when the fuel consumption quantity after the start is present in the range from the fuel consumption quantity H corresponding to the delay D to the fuel consumption quantity F corresponding to the period A to C.

A structure of this second embodiment is similar to that of the first embodiment, which is illustrated in FIG. 2. As a modification of each of the means, additional processing is performed by each of the fuel switching detecting means 51, the property change judging means 52, and the fuel property estimating means 53. As a modification associated with the use of the fuel consumption quantity after the start among the modifications described above, the fuel switching detecting means 51 additionally performs processing for clearing the fuel consumption quantity after the start between Steps S304 and S305 illustrated in FIG. 5 when the state of the ignition switch (IgSW) 60 changes from OFF to ON at the time of starting. Moreover, in the SGT signal synchronization processing performed by the fuel property estimating means 53, the fuel consumption quantity after the start is always calculated. Therefore, prior to Step S601 illustrated in FIG. 8, the fuel consumption quantity after the start is calculated by the same method as that used in Step S604.

In this second embodiment, the above-mentioned processing is performed by the fuel switching detecting means 51 as in the first embodiment described above because the ignition switch 60 is normally placed in the OFF state at the time of refueling. However, in the case where the processing is performed even for the refueling during the operation of the internal combustion engine while the ignition switch 60 is in the ON state, the fuel consumption quantity is suitably cleared even immediately after the stop of the vehicle.

The 0.01-second cycle processing performed by the property change judging means 52 is described with reference to FIG. 11. As in Step S401, it is judged in Step S801 whether or not the fuel level is low.

If the fuel level of the fuel in the fuel tank 20 is low (YES), there is a possibility that the quantity which is too small to judge whether or not the fuel switching has occurred is refueled. Therefore, in Step S802, it is further judged whether or not the fuel consumption quantity after the start is within the preset range of the fuel consumption quantity. The set range is from the fuel consumption quantity H to the fuel consumption quantity F illustrated in FIG. 10, as described above. However, it is expected that a variation occurs in the behavior of the change in the alcohol concentration, and hence it is recommended that the range of the fuel consumption quantity be set with some margin.

If the fuel consumption quantity after the start is within the above-mentioned range, it is determined in Step S803 that there is a possibility that the correction value may be changed due to the change in the fuel property as in Step S402, whereby the property change judgment condition is satisfied. From Steps S803 to S806, the same processing as that performed in Steps S402 to S405 is performed.

On the other hand, if the fuel level is not low (NO) in Step S801 or the fuel consumption quantity after the start is not within the above-mentioned range (NO) in Step S802, it is determined in Step S807 that the property change judgment condition is not satisfied. Then, the processing is terminated.

As described above, according to the second embodiment, in the case where the correction value becomes out of the predetermined range, the property change judging means 52 judges whether or not the fuel property has changed when the fuel consumption quantity after the start at that time is within the preset range of the fuel consumption quantity. Therefore, the property change period may be set with higher accuracy.

Although the predetermined condition for the property change judging means 52 is not switched in the first and second embodiments, it is recommended that the predetermined condition be switched depending on some conditions. For example, different predetermined conditions may be used for the case where the fuel switching detecting means 51 is normal and for the case where a failure occurs in the fuel switching detecting means 51. If a failure occurs in the fuel switching detecting means 51, it is possible to know in advance that the judgment of the fuel switching is not made. Therefore, the predetermined condition of the property change judging means 52 is suitably switched to the one which is more easily satisfied.

Although the fuel level of the fuel in the fuel tank 20 is used for the detection of the fuel switching in the first and second embodiments, the criterion used for the detection of the fuel switching is not limited thereto. For example, the opening/closing of a fuel filler opening, a sudden change in internal pressure of the fuel tank 20, a sudden change in fuel temperature, or the like may be used. Alternatively, a sensor for directly detecting the fuel property may be used. In this case, the first and second embodiments are not required to be used if the sensor is capable of detecting the fuel property with good accuracy. However, a sensor which merely detects a relative change is not capable of directly detecting the fuel property correction value. Thus, in such a case, only the fuel switching is detected by the sensor, whereas the first and second embodiments are suitably used for the calculation of the fuel property correction value. Moreover, although the internal combustion engine uses the alcohol blended fuel in the first and second embodiments, the internal combustion engine may use other fuels as long as the correction value changes depending on the fuel property.

What is claimed is:

1. A fuel injection device for an internal combustion engine, comprising:
   an air-fuel ratio sensor for detecting an air-fuel ratio of an exhaust gas;
   target air-fuel ratio setting means for setting a target air-fuel ratio in accordance with an operating state of the internal combustion engine;
   air-fuel ratio detecting means for detecting an actual air-fuel ratio based on a detection signal of the air-fuel ratio sensor;
   fuel correction value calculating means for calculating a correction value for a fuel injection quantity so that the actual air-fuel ratio becomes equal to the target air-fuel ratio;
   fuel switching detecting means for detecting that fuel switching has occurred;
   fuel property estimating means for setting a period, in which there is a possibility that a fuel property changes, as a property change period when the fuel switching is detected by the fuel switching detecting means to calculate a fuel property correction value corresponding to another correction value for the fuel injection quantity based on the correction value within the property change period; and
   property change judging means for judging whether or not a change in the correction value is due to the change in the fuel property in a case where the correction value becomes out of a predetermined range even though the property change period is not set,
   wherein the fuel property estimating means sets the property change period even when the property change judging means judges that the fuel property has changed.

2. A fuel injection device for an internal combustion engine according to claim 1, further comprising learning value calculating means for calculating and retaining a learning value of a fuel system based on the correction value and for inhibiting an operation so as not to calculate the learning value when there is a possibility that the correction value changes due to the change in the fuel property.

3. A fuel injection device for an internal combustion engine according to claim 2, wherein at least any one of the operation of the learning value calculating means and the operation of the fuel system abnormality judging means is inhibited during the property change period.

4. A fuel injection device for an internal combustion engine according to claim 2, wherein at least any one of the operation of the learning value calculating means and the operation of the fuel system abnormality judging means is inhibited while the property change judging means judges that the fuel property has changed.

5. A fuel injection device for an internal combustion engine according to claim 1, further comprising fuel system abnormality judging means for judging that an abnormality has occurred in the fuel system when the correction value exceeds a preset abnormality judgment value and for inhibiting an operation so as not to judge whether or not the abnormality has occurred in the fuel system when there is a possibility that the correction value changes due to the change in the fuel property.

6. A fuel injection device for an internal combustion engine according to claim 1, wherein the fuel switching detecting means detects that the fuel switching has occurred when refueling is performed.

7. A fuel injection device for an internal combustion engine according to claim 6, wherein:
   the fuel switching detecting means detects that the refueling has been performed based on a change in fuel level of the fuel in a fuel tank; and
   in the case where the correction value becomes out of the predetermined range, the property change judging means judges that the fuel property has changed when a quantity of the fuel in the fuel tank is small at that time.

8. A fuel injection device for an internal combustion engine according to claim 1, wherein:
   only a quantity of the fuel consumed by the internal combustion engine is pumped by a fuel pump from the fuel tank to a fuel injection valve; and
   in the case where the correction value becomes out of the predetermined range, the property change judging means judges that the fuel property has changed when a fuel consumption quantity after start at that time is within a preset range of the fuel consumption quantity.

9. A fuel injection device for an internal combustion engine according to claim 1, wherein the fuel property is a concentration of alcohol contained in the fuel.

* * * * *